(12) United States Patent
An

(10) Patent No.: US 6,832,821 B2
(45) Date of Patent: Dec. 21, 2004

(54) FLAT DISPLAY CASE ASSEMBLY

(75) Inventor: Sam Young An, Kumi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/147,052

(22) Filed: May 17, 2002

(65) Prior Publication Data

US 2002/0185940 A1 Dec. 12, 2002

(30) Foreign Application Priority Data

Jun. 11, 2001 (KR) .................................... P2001-32612

(51) Int. Cl.[7] .............................................. A47B 81/06
(52) U.S. Cl. .................................................... 312/7.2
(58) Field of Search ............................ 312/7.2, 223.1, 312/223.2, 257.1; 348/825, 836; 361/681, 682; 248/917, 918

(56) References Cited

U.S. PATENT DOCUMENTS 4,645,276 A * 2/1987 Flavigny .................. 312/257.1
4,651,256 A * 3/1987 Yamagishi .................. 361/682

FOREIGN PATENT DOCUMENTS

GB           2127279       * 4/1984    .................. 312/7.2

* cited by examiner

*Primary Examiner*—James O. Hansen
(74) *Attorney, Agent, or Firm*—Morgan, Lewis & Bockius LLP

(57) ABSTRACT

A case assembly in a flat display includes a flat display module for presenting a picture; a frame for holding edges of the flat display module; a front case and a rear case for holding the flat display module and the frame in place and fastening the flat display module and the frame together; a first fastening member provided on the front case; and a second fastening member provided on the rear case, wherein the first fastening member and the second fastening member are coupled together to fasten the front case and the rear case.

8 Claims, 3 Drawing Sheets

FLAT DISPLAY CASE ASSEMBLY

The present invention claims the benefit of Korean Patent Application No. P2001-32612 filed in Korea on Jun. 11, 2001, which is hereby incorporated by reference.

BACKGROUND OF THE INVENTION

1. Field of the Invention

The present invention relates to a flat display case assembly, and more particularly, to a flat display case assembly, in which a flat display module and a frame for holding the module are fastened by a case assembly of a front case and a rear case.

2. Discussion of the Related Art

In general, a flat display is provided with a flat display module and a case for holding the module. The flat display includes components such as an LCD (Liquid Crystal Display), a PDP (Plasma Display Panel) and an FED (Field Emission Display).

Referring to FIG. 1, an LCD is provided with a flat display module 1 having a light emitting part 1a, and a display part (or a liquid crystal panel part) 1b. A frame 2 is provided for holding the edges of the flat display module 1 and maintaining a required gap. A case 3, having a front case 3a and a rear case 3b, is provided for holding the display module and the frame together, wherein a picture is reproduced utilizing a molecular motion of the liquid crystal (not shown) in the liquid crystal panel part 1b.

A related art case assembly of the flat display will be explained, with reference to FIG. 2.

The related art case assembly is provided with a burring part 13a on the front case 3a and a screw hole 13b in the rear case 3b corresponding to the burring part 13a. A through hole 2a in the frame 2 extends from the front case 3a to the rear case 3b and corresponds to the screw hole 13b. The front case 3a, the rear case 3b, and the frame 2 are fastened together by inserting and tightening a bolt 4 through the screw hole 13b, the through hole 2a, and the burring part 13a. The burring part 13a, which is formed when a part of the front case 3a is dented by the bolt 4, protrudes from the front case 3a and has a cylindrical shape. The burring part is also threaded as a result of the pressure of the bolt 4.

However, the related art flat display case assembly has the following problems.

First, the protrusion of the burring part 13a is limited by the thickness of the front case 3a. Accordingly, if the front case 3a is too thin, the burring part 13a will not protrude sufficiently to form a thread with which the bolt 4 can engage.

Furthermore, if the burring part 13a is too thin, then it may be susceptible to an external shock or vibration which causes the bolt 4 to disengage from the burring part 13a or wears down the thread of the burring part 13a, thereby providing insufficient fastening strength between the bolt 4 and the burring part 13a.

SUMMARY OF THE INVENTION

Accordingly, the present invention is directed to a flat display case assembly that substantially obviates one or more of the problems due to limitations and disadvantages of the related art.

An object of the present invention is to provide a flat display case assembly of a front case and a rear case which accurately fastens a flat display module to a case.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a case assembly is provided in a flat display, including a flat display module for presenting a picture; a frame for holding edges of the flat display module; a front case and a rear case for holding the flat display module and the frame in place and fastening the flat display module and the frame together; a first fastening member provided on the front case; and a second fastening member provided on the rear case, wherein the first fastening member and the second fastening member are coupled together to fasten the front case and the rear case.

In another aspect, a case assembly is provided in a flat display, including a flat display module for presenting a picture; a frame for holding edges of the flat display module; a front case and a rear case for holding the flat display module and the frame in place and fastening the flat display module and the frame together; a bolt inserted in a fastening hole in the front case; a nut fixed to an inside surface of the rear case and corresponding to the fastening hole; and a through hole for inserting the bolt therethrough, and a recess for inserting the nut formed in the frame, thereby coupling the bolt and the nut together to fasten the front case and the rear case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
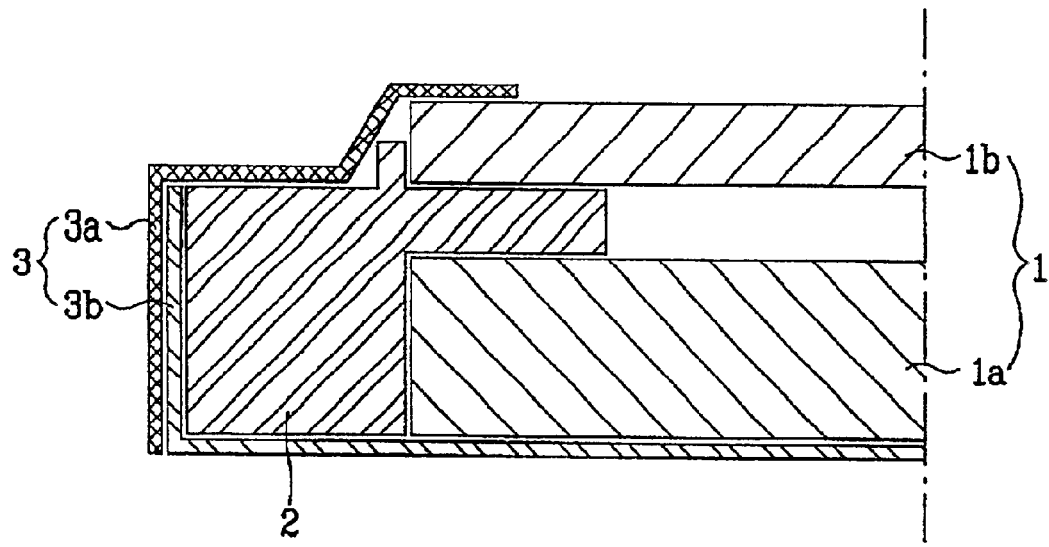
FIG. 1 illustrates a section of a related art liquid crystal display having a flat display.
Figure 2:
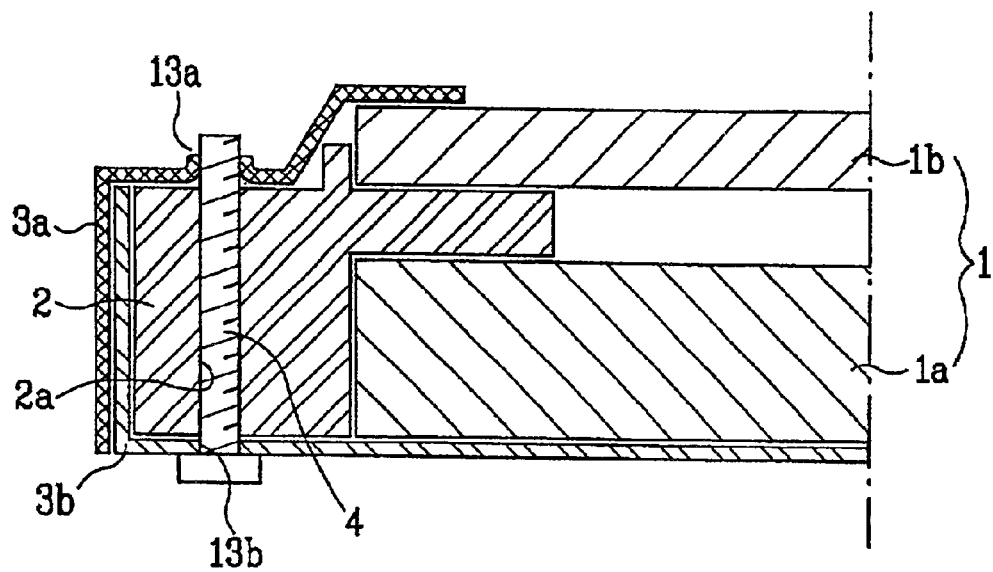
FIG. 2 illustrates a section of a related art flat display case assembly.

Reference will now be made in detail to the preferred embodiments of the present invention, examples of which are illustrated in the accompanying drawings. In explanation of the present invention, parts identical to the related art will be given the same reference numerals, further explanation of which will be omitted.

Figure 3:
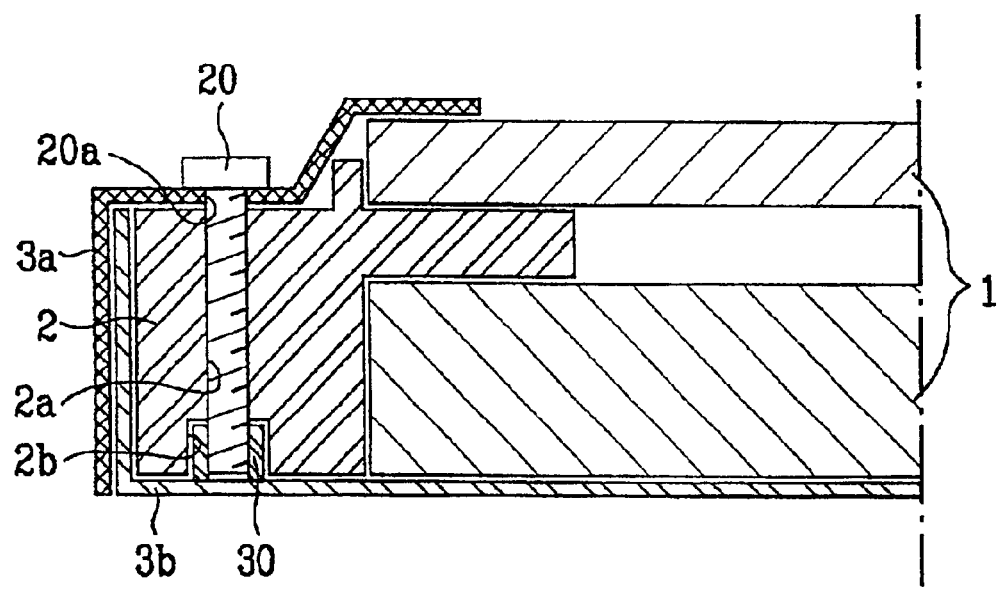
FIG. 3 illustrates a section of key parts of a flat display case assembly in accordance with a first preferred embodiment of the present invention.
Figure 4:
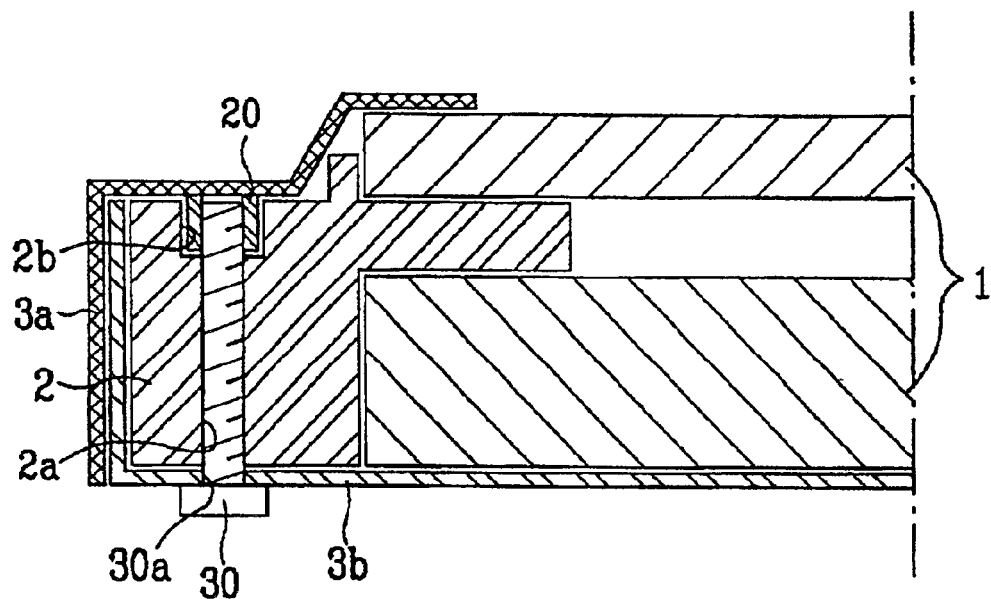
FIG. 4 illustrates a section of key parts of a flat display case assembly in accordance with a second preferred embodiment of the present invention.
Figure 5:
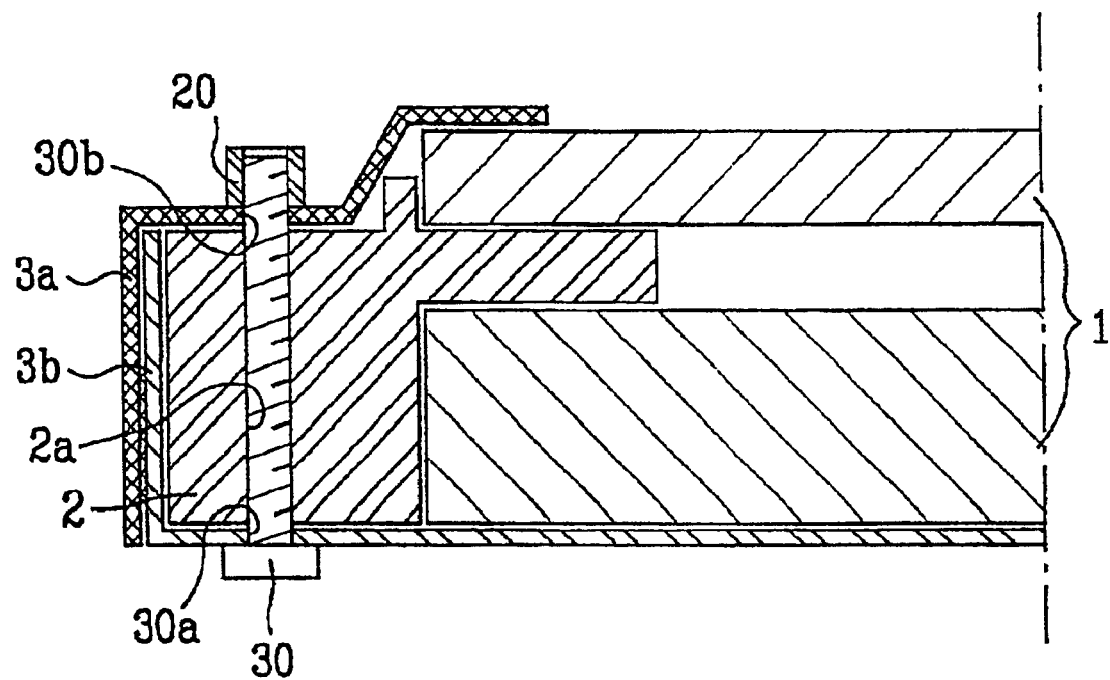
FIG. 5 illustrates a section of key parts of a flat display case assembly in accordance with a third preferred embodiment of the present invention.

Referring to FIGS. 3–5, a flat display case assembly of the present invention includes a flat display module 1 for presenting a picture, a frame 2 for holding the edges of the flat display module 1, and a front case 3a and a rear case 3b for fastening the flat display module and the frame together. The flat display case assembly further includes a separate fastening member 20 on the front case 3a, and a separate fastening member 30 on the rear case 3b. Thereby, the fastening member 20 and the fastening member 30 are held together and the front case 3a and the rear case 3b are held together.

A flat display case assembly in accordance with a first preferred embodiment of the present invention will be explained, with reference to FIG. 3.

The fastening member 20 is a bolt and the fastening member 30 is a nut. The bolt 20 is inserted in a fastening hole 20a in the front case 3a, and fastened with the nut 30. The nut 30 is welded or riveted to an inside surface of the rear case 3b. Along with this, there is a frame 2 with a through hole 2a extending from the front case 3a to the rear case 3b. A recess 2b is formed in the frame 2 for inserting the nut 30 therein and reduces the thickness of the flat display. It is preferred that the flat display is an LCD having a case assembly including the front case 3a and the rear case 3b.

A process for assembling the flat display case assembly in accordance with a first embodiment of the present invention will be explained, with reference to FIG. 3.

After the nut 30 is fixed to the rear case 3b, the frame 2 is put in place, with the nut 30 inserted in the recess 2b. Then, the front case 3a is assembled with the rear case 3b and the frame 2, and the bolt 20 is inserted sequentially through the fastening hole 20a in the front case, the through hole 2a in the frame, and the nut 30, and fastened.

A flat display case assembly in accordance with a second preferred embodiment of the present invention will be explained with reference to FIG. 4.

In the flat display case assembly of FIG. 4, the fastening member 20 is a nut and the fastening member 30 is a bolt. The bolt 30 is inserted in the fastening hole 30a in the rear case 3b, and fastened to the nut 20. The nut 20 is fixed to an inside surface of the front case 3a by, for example, welding or riveting. A frame 2 extends from the front case 3a to the rear case 3b. The frame has a through hole 2a for inserting the bolt 30 therethrough. In order to reduce a total thickness of the flat display, the frame 2 has a recess 2b for inserting the nut 20.

A flat display case assembly in accordance with a third preferred embodiment of the present invention will be explained with reference to FIG. 5.

In the flat display case assembly of FIG. 5, the fastening member 20 is a nut and the fastening member 30 is a bolt. The bolt 30 is inserted in the fastening hole 30a in the rear case 3b and a fastening hole 30b in the front case 3a, and fastened to the nut 20. The nut 20 is fixed to an outside upper surface of the front case 3a by, for example, welding or riveting. A frame 2 extends from the front case 3a to the rear case 3b. The frame has a through hole 2a for inserting the bolt 30 therethrough.

The flat display case assembly of the present invention has the following advantages, for example.

Since the front case and the rear case are assembled by using additional fastening members which prevent the case assembly from falling apart as a result of an external impact or a vibration, the components of the flat display module built in the case assembly can be fastened completely.

It will be apparent to those skilled in the art that various modifications and variations can be made in the flat display case assembly of the present invention without departing from the spirit or scope of the invention. Thus, it is intended that the present invention cover the modifications and variations of this invention provided they come within the scope of the appended claims and their equivalents.

What is claimed is:

1. A case assembly in a flat display, comprising:
   a flat display module for presenting a picture;
   a frame for holding edges of the flat display module;
   a front case and a rear case for holding the flat display module and the frame in place and fastening the flat display module and the frame together;
   a first fastening member provided on the front case; and
   a second fastening member provided on the rear case,
   wherein the first fastening member and the second fastening member are coupled together to fasten the front case and the rear case, and the second fastening member is provided within an internal recess portion of the frame that extends partially through the frame.

2. The case assembly as claimed in claim 1, wherein the first fastening member is a bolt, and the second fastening member is a nut.

3. The case assembly as claimed in claim 2, wherein the bolt is inserted in a fastening hole in the front case, and fastened to the nut.

4. The case assembly as claimed in claim 3, wherein the nut is fixed to an inside surface of the rear case.

5. The case assembly as claimed in claim 4, wherein the frame extends from the front case to the rear case, and has a through hole for inserting the bolt therethrough.

6. The case assembly as claimed in claim 5, wherein the internal recess is at the through hole for inserting the nut therein.

7. The case assembly as claimed in claim 6, wherein the flat display is a liquid crystal display.

8. A case assembly in a flat display, comprising:
   a flat display module for presenting a picture;
   a frame for holding edges of the flat display module;
   a front case and a rear case for holding the flat display module and the frame in place and fastening the flat display module and the frame together;
   a bolt inserted in a fastening hole in the front case; and
   a nut fixed to an inside surface of the rear case and corresponding to the fastening hole,
   wherein the frame includes a through hole for inserting the bolt therethrough and a recess for inserting the nut therein, thereby coupling the bolt and the nut together to fasten the front case and the rear case.

\* \* \* \* \*